United States Patent [19]

Guthmueller et al.

[11] Patent Number: 4,822,986

[45] Date of Patent: Apr. 18, 1989

[54] METHOD OF DETECTING AND READING POSTAL BAR CODES

[75] Inventors: Rodney K. Guthmueller, Lewisville; Richard K. Habitzreiter, Dallas, both of Tex.

[73] Assignee: Recognition Equipment Incorporated, Irving, Tex.

[21] Appl. No.: 40,267

[22] Filed: Apr. 17, 1987

[51] Int. Cl.$^4$ .............................................. G06K 7/10
[52] U.S. Cl. .................................... 235/462; 235/456; 235/470
[58] Field of Search ................. 235/455, 456, 462, 470

[56] References Cited

U.S. PATENT DOCUMENTS 4,408,344 10/1983 McWaters et al. ............. 235/462 X
4,760,247 7/1988 Keane et al. ...................... 235/456 X

*Primary Examiner*—David L. Trafton
*Attorney, Agent, or Firm*—Ross, Howison, Clapp & Korn

[57] ABSTRACT

A Bar Code Reader of a Video Processor Unit receives video data from a scanner and processes it to locate a bar code at the bottom of a document which represents a postal zip code. The scanner generates an array of cells of video data and provides each cell with a gray weight value corresponding to a detected blackness level of a small portion of the scanned document. The Bar Code Reader moves a template mask over the array and calculates area sums of gray weight values for cells within predetermined areas of the template mask. The area sums are used to compute Bar scores for determining the presence and position of tall and short bars in a bar code field. The positions of the tall and short bars in the bar code field are translated into postal zip code information.

10 Claims, 5 Drawing Sheets

METHOD OF DETECTING AND READING POSTAL BAR CODES

TECHNICAL FIELD

This invention relates to optical bar code readers and, in particular, to a method of scanning documents to detect and read tall and short bars in postal bar codes.

BACKGROUND OF THE INVENTION

The Postal Numeric Encoding Technique (POSTNET) was developed by the U.S. Postal Service to provide an optimized bar code system for encoding zip code information on letter mail. The bar code is printed at the lower right-hand corner of the envelope. The basic elements of the code are tall and short bars, representing binary ones and zeros, respectively. Each five bars of the code represent a numeric digit. The ten digits are represented by the following combinations of tall and short bars:

| | |
|---|---|
| 1 - 00011 | 6 - 01100 |
| 2 - 00101 | 7 - 10001 |
| 3 - 00110 | 8 - 10010 |
| 4 - 01001 | 9 - 10100 |
| 5 - 01010 | 0 - 11000 |

The above combinations represent all possible combinations of two tall bars and three short bars.

A POSTNET bar field may have one of three formats containing 32, 52, and 69 bars, respectively. The 32 bit field is referred to as an "A field". The first and last bars are frame bars that are always tall bars. The remaining 30 bars represent a five digit zip code and a sixth digit that is a check character. The check character's value is such that the sum of the five zip code digits plus the check digit is a multiple of 10. For example, if the five digit zip code is 75028, then the check digit will have a value of 8, making the sum of all six digits a multiple of 10 (i.e. 7+5+0+2+8 +8=30).

The 52 bit field is referred to as a "C field". As with the A field, the first and last bars are frame bars. The remaining 50 bars comprise a nine digit zip code and a check character.

The third field type is actually two bar fields on a single envelope. If a mail piece already contains an A field, then a second field may be added to the letter to encode the remaining four digits of the zip code. The second field is added to the right of the A field and is referred to as a "B field". The B field comprises 37 bars, making a total of 69 bars for the A and B fields combined. As with the A and C fields, the first and last bars of the B field are frame bars, and are always tall bars. The first ten bars after the first frame bar of the B field represent the two digit zone of the nine digit zip code. The next four digits (20 bars) are the remaining four digits of the nine digit zip code. The last five bars before the frame bar are the check characters. Thus, the B field comprises six digits plus a check character. A B field always accompanies an A field and never exists by itself on an envelope.

The POSTNET bar fields are located approximately ¼ inch above the bottom of the envelope. The A or C field begins about four inches from the right-hand edge of the mail piece. If a letter contains an A and a B field, the B field begins approximately 2.2 inches from the right-hand edge of the envelope. The bars in the field are spaced such that there are approximately 21 bars per inch. Each bar is approximately 0.02 inches wide. A tall bar is about 0.125 inches in height and a short bar is about 0.05 inches in height.

In the past, bar code readers have used black/white video data to determine the presence of bars based on the number of black cells in each scan of an optical scanner. Such readers, however, are sensitive to extraneous marks or smudges between the individual bars and in the bar fields. Furthermore, such readers have difficulty distinguishing bar codes from textual information. Thus, in the field of automated mail handling and sorting equipment there is a need for a bar code reader that can detect and read bar codes rapidly and accurately, even with the presence of smudges and written or typed information in the bar code field.

SUMMARY OF THE INVENTION

The present invention is a method that utilizes a Video Processor Unit (VPU) for detecting and reading postal bar codes. The VPU includes a Data Lift Unit, such as an optical scanner, for generating video data representative of the written, printed, or coded information on pieces of mail. The video data is received by a Video Controller (VPUVC) where it is processed and transmitted to a Bar Code Reader (VPUBR). The VPUBR comprises two microprocessors: a reader processor and a linker processor. Each of these processors may be, for example, a TI 9995 manufactured by Texas Instruments of Dallas, Tex.

The first step in reading a bar code on an envelope is to locate the tall and short bars. The VPUBR of the present invention uses the same scanned video data that is used for character recognition, thus eliminating the need for a separate optic system for the bar code reader. One vertical scan of video data from the scanner consists of 512 cells of video data. Since the bar code is located at the bottom of the envelope, the bar code reader ignores all but the bottom 128 cells of each scan. The amount of video data may be reduced further by averaging adjacent even and odd numbered cells to form one cell, resulting in a total of 64 cells per scan. The video data is used to find tall and short bar elements in each scan. This process is performed by moving a template "mask" up each scan and developing a score that represents the probability that the mask is centered over a tall or short bar. Tall and short bar elements in each scan are then linked to elements from previous scans to generate the bars. Each bar has a thickness of about six scans with a distance of approximately 15 scans from the center of one bar to the center of the next bar. A tall bar extends vertically about 20 cells and a short bar extends vertically about 8 cells.

The template mask consists of three area sums: a window area sum a tall bar area sum and a short bar area sum. The area sums are generated by adding together gray weight values for all the cells in a certain area. The scanner senses levels of blackness and assigns each cell a gray weight value ranging from 0 to 15 (0 to F, hexadecimal). The short bar area sum is generated by adding together all the cells in a 14 cell by 8 scan area. The tall bar area sum is generated by adding together all the cells in a 28 cell by 8 scan area centered in a window area. The window area sum is the sum of all cells in a 40 cell by 4 scan area. Since the tall and short bar areas are totally within the window area, the window area sum is never less than the tall or short bar area sums.

The window and bar area sums are compared for the purpose of generating a tall score and a short score. If the template mask is centered over a tall bar, the window area sum will not be much greater than the tall bar area sum, but it will be much greater than the short bar area sum. As a result, a high tall score and a low short score are generated. If the template mask is centered between bars, there will be many cells in the window that are outside of the bar areas. In this case the window area sum will be significantly greater than either of the bar area sums. As a result, a low tall score and a low short score are generated.

As the template mask moves up a scan, the score begins with a low value and increases as the template mask becomes centered over a bar. The score then becomes smaller as the template mask moves above the bar. The value and the vertical position of the highest score are saved for each bar element. If the template mask is centered over an alpha-numeric character or other non bar code video, the window area sum is likely to have a much higher value than the bar area sums. The bar score equation places a large negative weight on video that is in the window area but outside the bar areas, so that non bar code video receives a low score.

The tall and short bar scores are analyzed separately to detect the bar elements. A bar element begins when a positive score is first generated for a scan. The score is saved and compared to the score that is generated during the next scan. If the new score is higher, it replaces the old score in memory. This process continues until a zero score occurs, which represents the end of a bar element. When a score is saved in memory, the cell position is also saved. When the end of an element is detected, the element score and position are saved and the entire process is repeated to locate additional bar code elements until the entire bar code has been scanned.

The scores and positions of the bar elements in adjacent scans are also analyzed to determine if they are part of the same bar. The highest score for each bar is then determined and the bar's score and vertical and horizontal position are output to the bar linker processor.

The bar linker processor links the bars into bar fields, calculates the field length and pitch, and outputs the results to the reader processor. The reader processor then decodes the bar code and outputs the data to the VPU. If the reader processor is able to decode the bar field, it outputs the resulting zip code (either 5 or 9 digits). If the reader processor is not able to decode the field, it outputs one of the following terminator codes: no bars present, unreadable bar code, probable A field, or probable C field. The probable A field and probable C field codes are based upon a terminator code from the linker processor that is based on the field's position, length, and pitch.

BRIEF DESCRIPTION OF THE DRAWINGS

For a more complete understanding of the present invention and for further advantages thereof, reference is now made to the flowing Detailed Description taken in conjunction with the accompanying Drawings, in which.

DETAILED DESCRIPTION

The present invention comprise a method of detecting and reading postal bar codes on pieces of mail. Each piece of mail is scanned by an optical scanner which generates an array of video data. Each vertical scan by the scanner produces 512 individual cells of video data. The scanner senses levels of blackness and assigns a gray weight value ranging from 0 to 15 (0 to F, hexadecimal) to each cell.

The present invention could be implemented using black/white video rather than gray video. However, the use of black/white video would require either a correlator circuit or a video threshold circuit. A correlator circuit would have to be relatively complex in order not to degrade the video data. Further, a correlator circuit would tend to fail in reading documents, such as checks, with a bi-modal background. Similarly, a threshold circuit would tend to fail if the bar code is very light or the document background is very dark. The present invention eliminates these problems by retaining color information in the gray values. As described below, the present invention eliminates "noise" from the video data by using software logic.

Figures 1, 2:
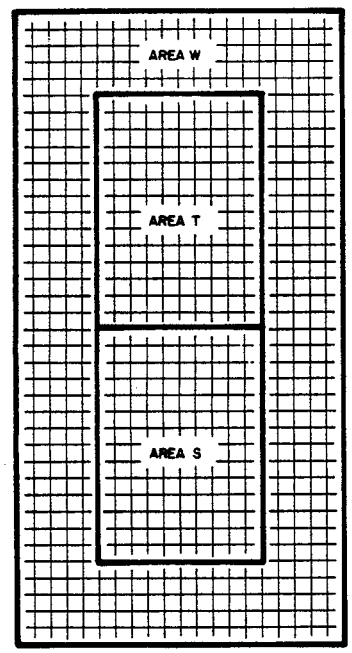
FIG. 1 is an illustration of the video scan template mask of the present invention.
FIG. 2 illustrates the calculation of row sums and area sums of gray weight values.

Referring to FIG. 1, the template mask of the present invention is shown as including Areas W, T, and S, each comprising a plurality of video scan cells. Associated with each cell is video data comprising a gray weight value determined by the blackness level sensed by the scanner. Area sums are generated by adding together the gray weight values for all the cells in certain areas. A short bar area sum is generated by adding together all the cell values in the 14 cell by 8 scan area labeled Area S. A tall bar area sum is generated by adding together all the cell values in Areas S and T, representing a 28 cell by 8 scan area. A window area sum is the sum of all the cell values in the 40 cell by 14 scan area comprising Areas S, T, and W.

The first step in generating the window and bar area sums is adding together the cells horizontally across the area. The resulting row sums are then added together to form the area sums.

FIG. 2 shows a 20 cell by 19 scan area of video cells having gray weight values indicated in hexadecimal notation. For purposes of illustration, a window area row comprising cell 08 of scans 04 through 17 is outlined in bold face. The row sum for cell 08 of scan 17 is the sum of cell 08, scans 04 through 17, $(5+7+9+11+11+6+4+1+2)$ which equals 56 (decimal notation). The row sum of cell 08 of scan 18 is the row sum for cell 08 of scan 17 plus cell 08 of scan 18 minus cell 08 of scan 14, or $56+2-5=53$. The 14 scan row sums for scans 17 and 18 are shown in the last two right-hand columns of FIG. 2. A window cell delta adder outputs the difference between the new cell and the delayed cell. In the previous example, the new cell would be cell 08 of scan 18 and the delayed cell would be cell 08 of scan 04. This difference added to the row sum for scan 17 forms the row sum for scan 18. The window row sum adders add the cell delta to the previous row sum. The row sums are delayed one scan by the window row sum delay memories. The row sums that are written to the memory during scan 18 become the previous row sums for scan 19. The row sums are latched by a row sum latch and are output to an area sum logic.

The bar row sum logic is identical to the window row sum logic except that the bar row sum is 8 scans wide whereas the window row sum is 14 scans wide. In the example shown in FIG. 2, the bar row sum for cell 08 of scan 17 is the sum of cell 08 of scans 07 through 14, as shown below. The bar row sum for cell 08 of scan 18 is the row sum for scan 17 plus cell 08 of scan 15 minus cell 08 of scan 07, as shown below.

Scan 17 Bar Row Sum = 11+11+6+4+1+0+0+0 = 33
Scan 18 Bar Row Sum = 11+6+4+1+0+0+0+0 = 22 or:
33+(0−11) = 22

The window row sum delay logic determines the height of the window area by delaying the row sum a known number of clock cycles, similar to the way in which the width is determined by delaying the video a known number of scans. The delay period is determined by a delay address Programmable Array Logic (PAL).

The window area sum logic, tall bar area sum logic, and short bar area sum logic operate the same as the row sum logic, except that the inputs are row sums instead of cells. The delayed row sum is subtracted from the new row sum to generate the row sum delta. The area sum from the previous clock is then added to the row sum delta to compute the new area sum. Referring to FIG. 2, for purposes of illustration assume that the height of the window area is 20 cells, the height of the tall bar area is 14 cells, and the height of the short bar area is 7 cells. In this case, the window area sum for cell 20 of scan 17 would be the sum of row sums 01 to 20 for scan 17, or 482. The tall bar area sum would be the sum of row sums 04 through 17 for scan 17, or 482. The short bar area sum would be the sum of row sums 04 through 10 of scan 17, or 231.

A bar row sum delay logic determines the height of the tall and short bar areas. The first delay is through a pipeline register. The pipeline register can delay the bar row sum one to four clocks. The delay determines the number of cells from the top of the window area to the top of the tall bar area. For example, if the window area height is 18 cells and the tall area height is 12 cells, then the pipeline register would delay the bar row sum three clocks to center the tall bar in the window area: three cells on top, twelve cells for the tall bar, and three cells on the bottom. A bar row sum delay PAL determines the delay.

By using the template mask of the present invention, each video cell position is given a score based on the probability that a bar is centered around that position. Actual bars score much higher than bi-modal noise, smudges, text, etc. Thus, sources of noise can be eliminated by software logic based on computed scores. Furthermore, since every bar score includes a vertical and horizontal position, it is possible to eliminate noise that looks like a bar but is out of position based on the twenty bars per inch pitch requirement.

The window area and bar area sums are compared by score PROMs. The PROMs output a score that represents the probability that the template mask is centered over a bar. If the bar area sum is high and the window area sum is not much higher (i.e. most of the cells in the window are in the bar area), then the score will be high. As the window area sum becomes much larger than the bar area sum, the score decreases. The tall score PROM equation is as follows:

$$TS = (4.5*TAS - 3.5*WAS) - 8,$$

where TS is the tall score, TAS is the tall area sum, and WAS is the window area sum. The offset of 8 prevents noise alone from generating a positive score. Any negative score results in a zero output from the PROM. The above equation may be rewritten as follows:

$$TS = (TAS - 3.5*W) - 8, \text{ where } W = WAS - TAS.$$

The new variable W is the sum of all cells in the window outside the tall area. This equation gives a better picture of how the score PROM works. The cells in the window outside the tall area have a large negative weight. Thus, the score falls quickly when noise is present between bars, or when the data in the bar code zone is text.

The short score PROM equation is as follows:

$$SS = 2*(3.5*SAS - 2.5*WAS) - 8, \text{ or}$$

$$SS = 2*(SAS - 2.5*W) - 8, \text{ where } W = WAS - SAS.$$

As shown above, the short score is multiplied by two, whereas the tall score is not. This is to compensate for the fact that there are twice as many cells in the tall area as there are in the short area. Also, the negative weight of the window cells is less for the short score because there are more cells in the window outside the short bar area.

A Bar Score Controller (BSCONT) uses the bar scores to locate the bar elements. At the beginning of a scan, the BSCONT latches the score and cell address. The score at begin scan is always zero. The latched score remains in the maximum score latch until a higher score is received, whereupon the BSCONT latches the new higher score. The BSCONT continues to latch the highest score value, as well as the cell address where that score occurred, until the score returns to zero. At that point, the highest score and cell address are shifted into a FIFO, the score latch is reset to zero, and the BSCONT begins looking for another element in the scan. At the end of each scan, the BSCONT shifts an end of scan flag (EOS) into the FIFO.

The BSCONT analyzes both tall and short bar scores. When the BSCONT is reset, the controller clears the element count bits and removes the score latch enable, FIFO shift in, and end of scan (EOS) flags.

Figure 3:
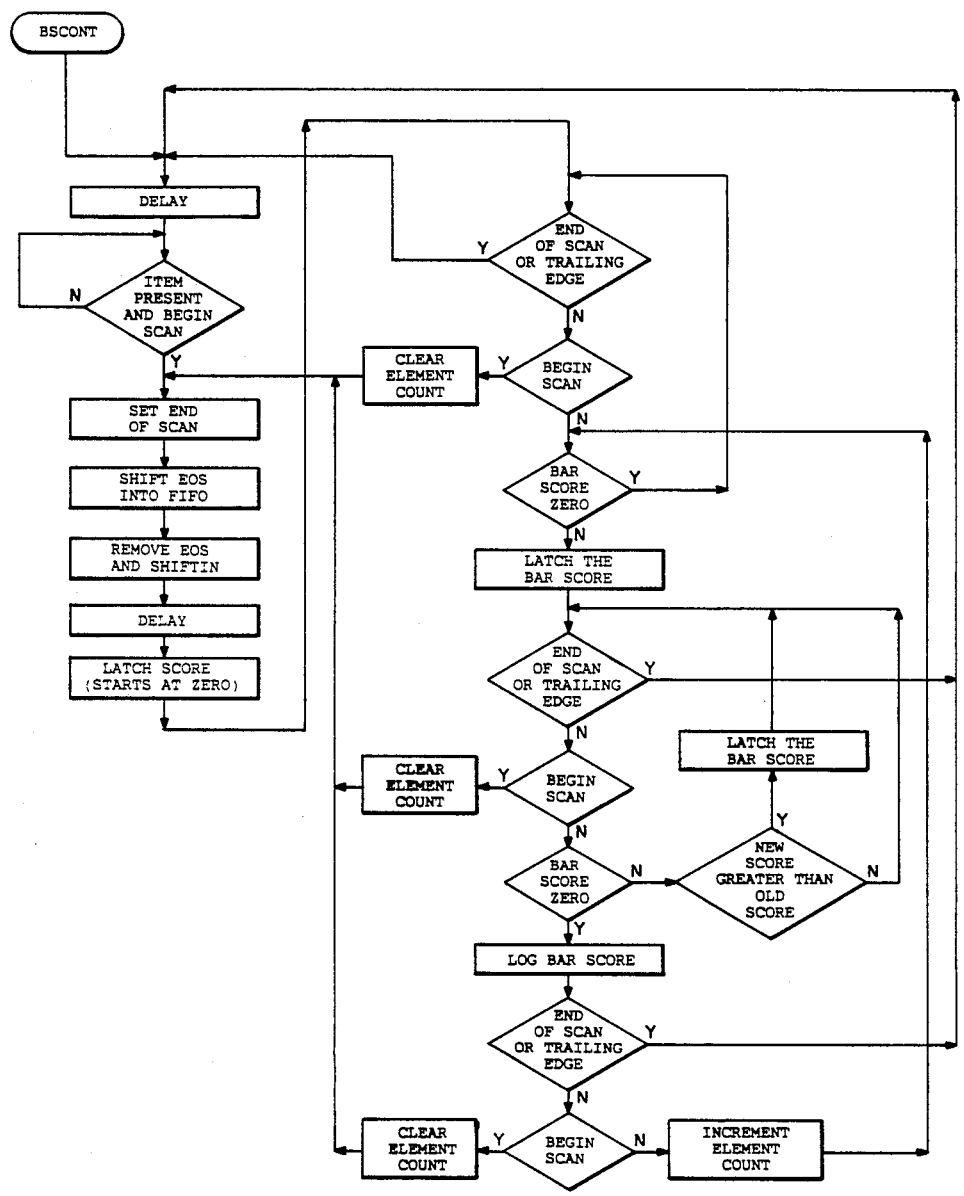
FIG. 3 is a flow diagram for the Bar Score Controller of the present invention.

As shown in the flow diagram of FIG. 3, when the BSCONT senses an item present, the controller sets the end of scan (EOS) flag and shifts the scan value into the FIFO. The first incoming score is latched into the maximum score latch. Since the bar area sums are always zero until the row sums are delayed through the pipeline register, the score is always zero for at least three clocks. After a score has been latched, the BSCONT checks for begin scan or end of document flags. If begin scan has been received, the BSCONT clears the element count and resets the EOS flag. Otherwise, if a new score is received that is greater than the old score, the new score is latched into the maximum score latch. The BSCONT continues to latch the highest score until receiving a zero bar score or an end of document or begin scan flag. If a zero score is received, the values in the maximum score latch and element center latch are shifted into the FIFO and the zero score is latched into the maximum score latch. After shifting the maximum score into the FIFO, the BSCONT increments the element count and continues latching the maximum scores until an end of document or begin scan flag is received.

A normal POSTNET bar has a width of approximately 6 or 7 scans of video data. The bar score analyzers log bar elements for three or four scans as the window area moves toward the center of a bar. Bar element linker logic reads the bar element scores from one scan and compares them to the element scores from previous scans to find the highest score for each bar. The score and the vertical (cell number) and horizontal (scan number) positions for the br are then shifted into a FIFO, where they are read by the linker processor.

A Bar Element Linker Controller (BELLNK) compares elements to determine whether or not they link. The BELLNK enables a first element and latches it, then it enables a second element and compares it to the first element. The first element's score is latched into a score comparator. The first element's cell position is latched by an element address latch. An element address difference adder and a link PROM compare the latch cell address to the enable cell address. If the addresses are approximately the same, then the elements are linked. The PROM determines how much the two cell addresses may differ and still be linked. In the current embodiment, the link PROM is programmed with a link tolerance of 20 cells. If two elements are linked, the BELLNK selects the element with the higher score and saves it in an old element FIFO.

For each scan the BELLNK goes through a two-step process to locate the bars. In the first step, it compares the tall and short elements to determine if they link. If the elements do not link, then the element with the lower cell address becomes the new element. If the elements are linked, then the element with the higher score becomes the new element. The new element is then compared to the old element, which is output from the old element FIFO. If the new and old elements link, then the element with the higher score is shifted back into the old element FIFO. If the elements do not link and the new element is lower, the new element is shifted into the old element FIFO. If the elements do not link and the old element is lower, the end of a bar is indicated. At this point, the old element score, cell address, and scan address are shifted into the bar output FIFO. Thus, the old element FIFO contains old element data from the previous scan and new element data from the current scan. An EOS flag is shifted into the FIFO at the beginning of each scan to separate new data from old data. All tall, short, and old bar elements in the FIFO are processed and shifted out in a single scan.

Figure 4A:
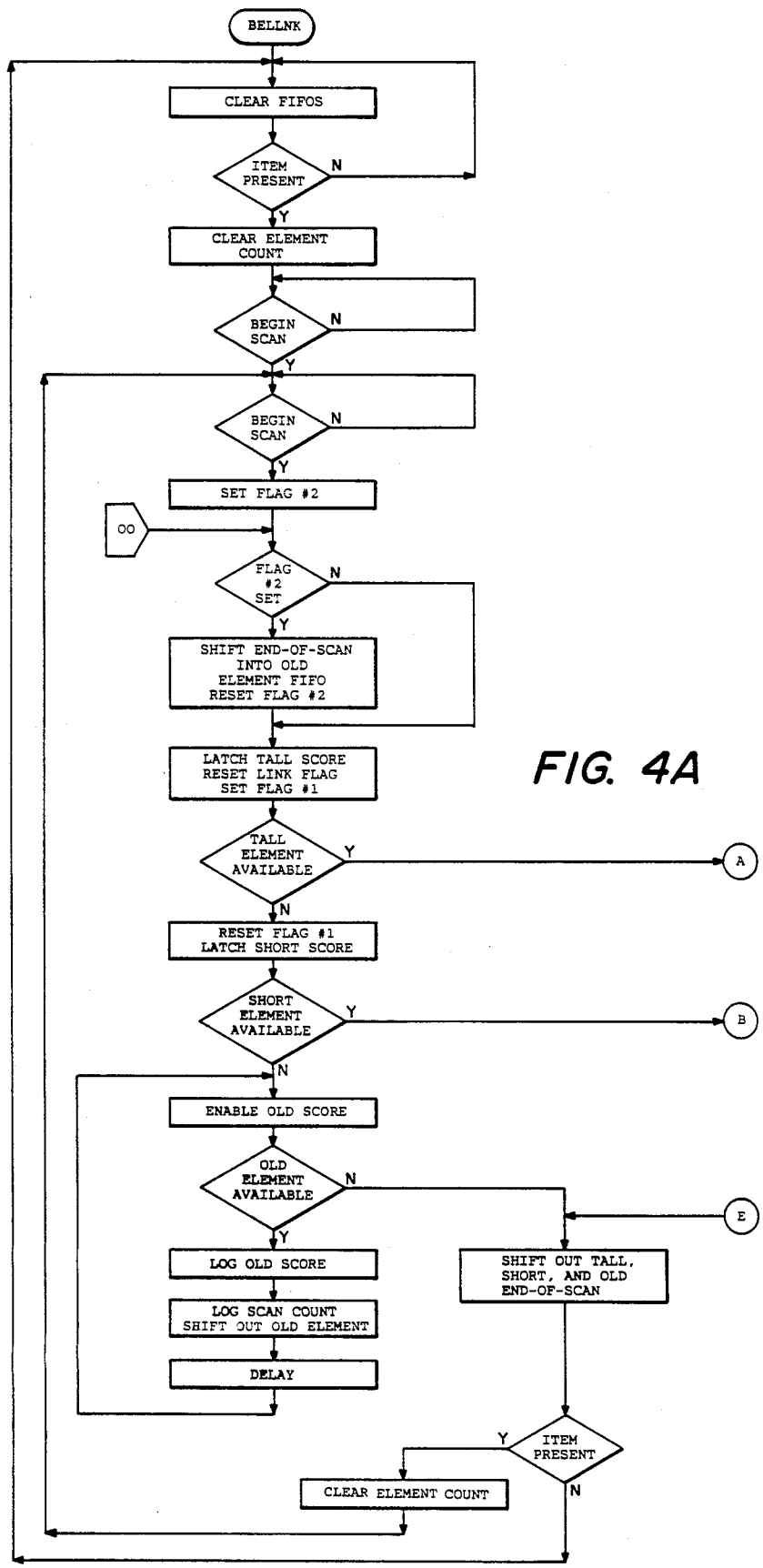
FIGS. 4A-C comprise a flow diagram for the Bar Element Linker Controller of the present invention.
Figure 4B:
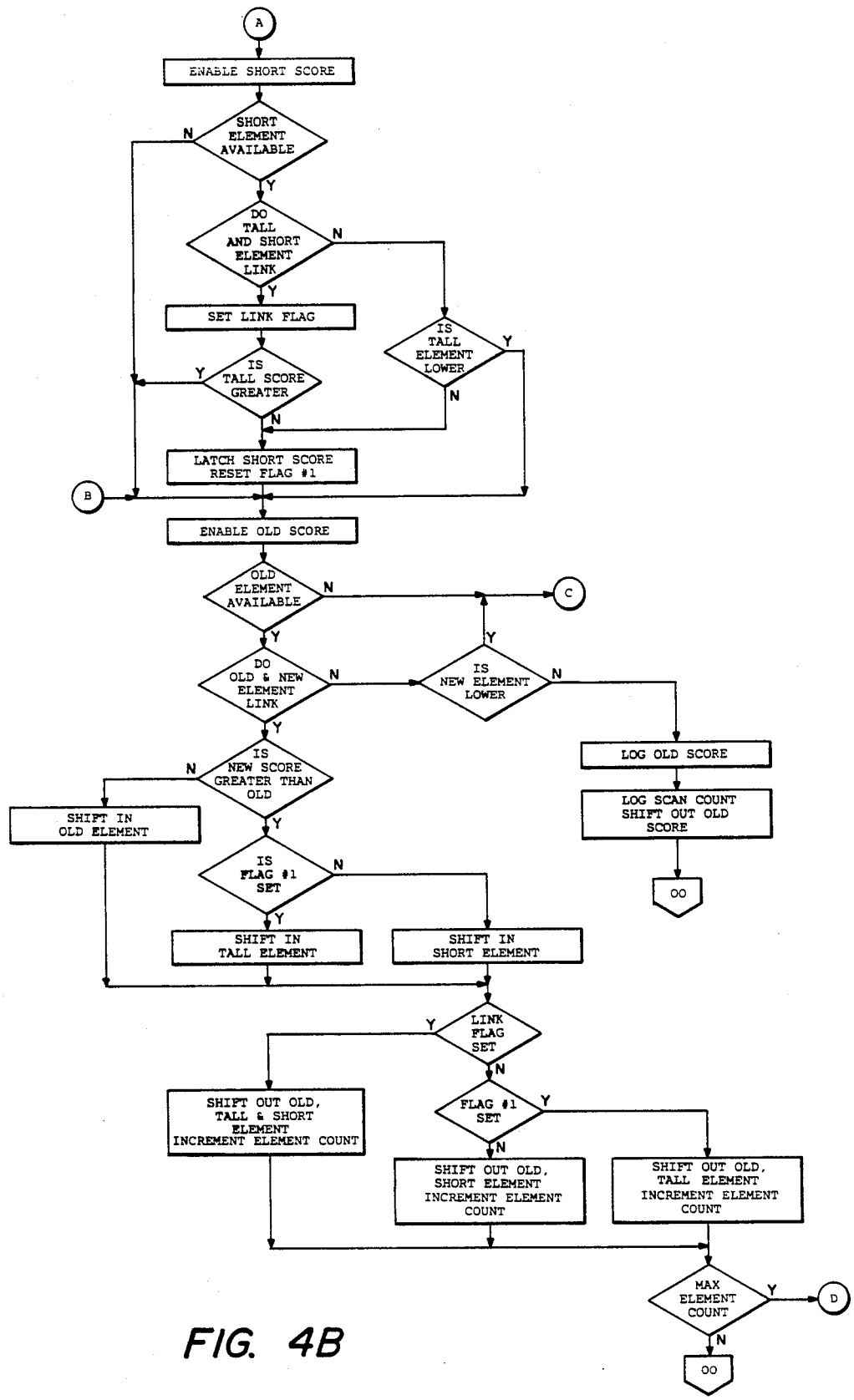
Figure 4C:
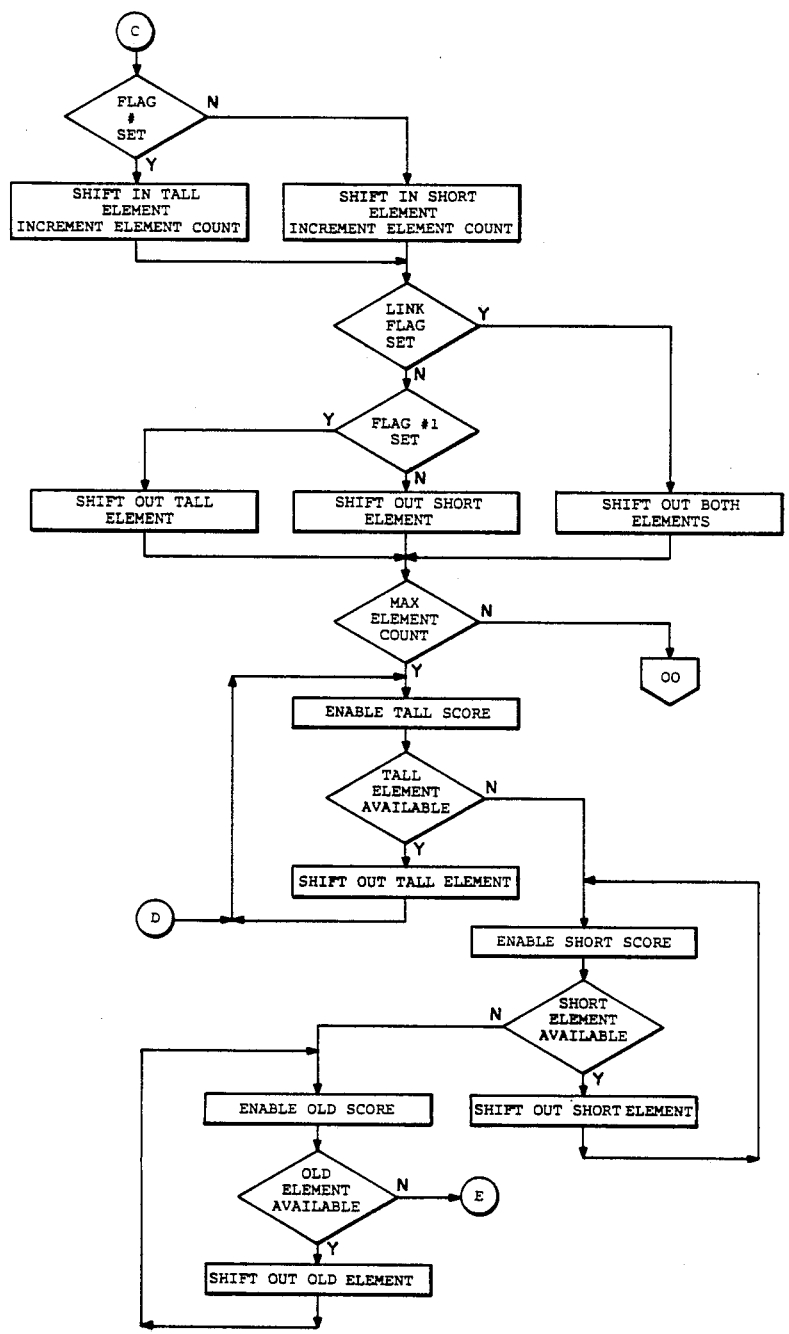

Operation of the Bar Element Linker Controller (BELLNK) is illustrated in the flow charts of FIGS. 4A–C, which are connected as indicated by the reference letters. The BELLNK operates one scan after the score analyzers of the BSCONT. The one scan delay allows the BSCONT to enter one scan of data into the tall and short bar FIFOs. An EOS flag is set at the beginning of a scan.

The BELLNK begins by comparing the elements in the tall and short bar FIFOs. If there is no tall element in the FIFO, then a short element is used for the next step. If there is no short element, then a tall element is used for the next step. If there are neither any tall nor short elements, then this step is bypassed. If there are both a tall element and a short element, then the BELLNK compares the two elements' cell addresses. The tall element is enabled and latched, and then the sort element is enabled and compared to the tall element. If the two elements' cell addresses are approximately equal, the two elements are linked as part of the same bar and the BELLNK uses the element with the higher score for the next step. The BELLNK also sets a link flag to indicate that the tall and short element FIFOs both need to be shifted out before comparing the next element. If the tall and short elements are not linked, then the element with the lower cell address is used for the next step. Whichever element is used for the next step is referred to as the "new element". If the new element is the short element, then the short element is enabled and latched.

The old element FIFO is used to store the highest score for each bar. This is done by comparing scores from previous scans (old element) to scores from the current scan (new element) and shifting the element with the higher score into the old element FIFO. The end of a bar is found when an element in the old element FIFO does not link with a new element from the tall or short element FIFOs. The EOS flag that is shifted in at begin scan separates the previous scan data from the current scan data.

The BELLNK continues by comparing a new element to the element in the old element FIFO. If the two elements link, then they are part of the same bar. The scores of the linked elements are compared and the BELLNK shifts whichever element has the higher score into the old element FIFO. If the two elements do not link, then the BELLNK shifts the element with the lower cell address into the old element FIFO. If the new element is lower, it is the first element of a new bar. If the old element is lower, it is the last element of a bar and the element's score, cell address, and scan address are shifted into the bar output FIFO.

Next, the BELLNK shifts out all the elements that have been processed in the first two steps. If the old element was lower than the new element and they did not link, then only the old element is shifted out and the new element is retained for the next comparison. If the new element was lower than the old element, or if the new and old elements linked, then the new element is shifted out. If the new and old elements linked, the old element is also shifted out. The BELLNK then returns to process the next set of elements. In addition, the BELLNK increments an internal counter each time it shifts an element into the old element FIFO. If the count reaches a maximum value, all remaining tall, short, and old elements from the previous scan are ignored and shifted out from the FIFOs.

By this process, the VPUBR analyzes and decodes the bar code video data that is generated by the bar detection logic. The linker processor links video data elements into bar fields, removes video data due to extraneous marks on the document, and analyzes the bar fields to determine pitch, field length, and field position on the document. The linker processor also determines whether the field is an A, B, or C field. The linker processor then provides an output to the reader processor. The reader processor uses the field length and bar pattern to decode the zip code information. The final zip code output is then provided to the VPU.

Although the method of the present invention has been described with respect to a specific embodiment, it is apparent that various changes and modifications may be suggested to one skilled in the art, and it is intended that the invention encompass such changes and modifications as fall within the scope of the appended claims.

I claim:

1. A method of reading a bar code containing tall and short bars on a document, comprising the steps of:
   detecting blackness levels of markings on the document;
   generating cells of video data, each cell having a gray weight value corresponding to the detected blackness level of a small area of the document; and
   analyzing the gray weight values to determine the positions of tall and short bars in the bar code.

2. The method of claim 1, wherein the step of detecting blackness levels comprises scanning the document to generate the cells of video data.

3. The method of claim 2, further comprising the step of forming an array of the cells comprising vertical scans and horizontal rows.

4. The method of claim 3, further comprising:
   moving a template mask over the array of cells;
   calculating area sums of the gray weight values within predetermined areas of the template mask; and
   computing bar scores from the area sums.

5. The method of claim 4, wherein the step of analyzing the gray weight values further comprises:
   comparing the bar scores to determine the positions of bar code elements;
   linking the bar code elements based on predetermined criteria to produce a bar code field; and
   translating the position of the tall and short bars in the bar code field into electronic data.

6. A method of detecting and reading a postal bar code containing tall and short bars on a document, comprising the steps of:
   scanning the document;
   detecting blackness levels of markings on the scanned document;
   generating an array of cells of video data, each cell having a gray weight value corresponding to the detected blackness level of a small portion of the scanned document;
   determining area sums of the gray weight values for a plurality of cells in the array;
   calculating bar scores from the area sums;
   analyzing the bar scores to determine the presence and position of tall and short bars in the bar code; and
   translating the position of the tall and short bars into postal zip code information.

7. The method of claim 6, wherein the step of determining area sums comprises:
   moving a template mask over the array; and
   calculating the area sums for the cells within predetermined areas of the template mask.

8. The method of claim 6, wherein the step of analyzing the bar scores comprises:
   comparing the bar scores to determine the presence and position of bar code elements; and
   linking the bar code elements based on predetermined criteria to produce a bar code field comprising the tall and short bars.

9. A method of detecting and decoding a postal bar code containing tall and short bars on a document, comprising the steps of:
   scanning the document;
   detecting blackness levels of markings on the scanned document;
   generating an array of cells of video data, each cell having a gray weight value corresponding to the detected blackness level of a small portion of the scanned document;
   moving a template mask over the array;
   calculating area sums of gray weight values of the video cells within predetermined areas of the template mask;
   computing bar scores from the area sums;
   comparing the bar scores to determine the presence and position of bar code elements;
   linking the bar code elements based on predetermined criteria to produce a bar code field comprising tall and short bars; and
   translating the positions of the tall and short bars in the bar code field into postal zip code information.

10. The method of claim 9, wherein the step of calculating area sums comprises:
    calculating a window area sum of cells within a window of the template mask;
    calculating a tall bar area sum of cells within a tall bar area inside the window; and
    calculating a short bar area sum of cells within a short bar area inside the tall bar area.

* * * * *